Feb. 12, 1963 W. H. DUNHAM 3,077,321

AERODYNAMICALLY DESIGNED AMPHIBIOUS VEHICLE

Filed Nov. 15, 1961 7 Sheets-Sheet 1

INVENTOR
William H. Dunham
BY Howard W. Hermann AGENT
and B. L. Zangwill ATTORNEY Feb. 12, 1963 W. H. DUNHAM 3,077,321

AERODYNAMICALLY DESIGNED AMPHIBIOUS VEHICLE

Filed Nov. 15, 1961 7 Sheets-Sheet 2

INVENTOR
William H. Dunham

BY Howard W. Hermann AGENT
and B. L. Zangwill ATTORNEY

Feb. 12, 1963 W. H. DUNHAM 3,077,321

AERODYNAMICALLY DESIGNED AMPHIBIOUS VEHICLE

Filed Nov. 15, 1961 7 Sheets-Sheet 3

INVENTOR
William H. Dunham
Howard W. Hermann
AGENT
BY and B. L. Zangwill
ATTORNEY INVENTOR
William H. Dunham
Howard W. Hermann
AGENT
BY and B. L. Zangwill
ATTORNEY Feb. 12, 1963 W. H. DUNHAM 3,077,321

AERODYNAMICALLY DESIGNED AMPHIBIOUS VEHICLE

Filed Nov. 15, 1961 7 Sheets-Sheet 5

INVENTOR
William H. Dunham
Howard W. Hermann
BY AGENT
and B. L. Zangwill
ATTORNEY INVENTOR
William H. Dunham
Howard W. Hermann
AGENT
BY
and B. L. Zangwill
ATTORNEY Feb. 12, 1963 W. H. DUNHAM 3,077,321

AERODYNAMICALLY DESIGNED AMPHIBIOUS VEHICLE

Filed Nov. 15, 1961 7 Sheets-Sheet 7

INVENTOR
William H. Dunham
BY Howard W. Hermann
AGENT
and B. L. Zangwill
ATTORNEY 3,077,321
Patented Feb. 12, 1963

3,077,321

AERODYNAMICALLY DESIGNED AMPHIBIOUS VEHICLE

William H. Dunham, Bethesda, Md., assignor to John J. McMullen Associates, Inc., New York, N.Y., a corporation of New York Filed Nov. 15, 1961, Ser. No. 152,691
23 Claims. (Cl. 244—12)
(Granted under Title 35, U.S. Code (1952), sec. 266)

The invention herein described may be manufactured and used by or for the Government of the United States of America for governmental purposes without the payment of any royalties thereon or therefor.

The present invention relates to an amphibious vehicle of aerodynamic design and more specifically to a ground effect machine capable of translatory motion over a surface of land, water or a combination of land and water, wherein the machine is of such aerodynamic design that it may, in addition to operating at a short distance above the surface, rise to a height above the surface which enables it to clear large superficial obstacles and enter into heavier-than-air flight, and which is capable of such maneuverability as to enable it to be of commercial practicability.

In the field of transportation there have been numerous apparatus devised which utilize the ground effect or air cushion principle; that is, these vehicles travel a short distance above a surface upon a cushion which separates the undercarriage of the vehicle from the surface over which it is travelling. Due to the fact that such vehicles are incapable of superseding obstacles which may block the path of motion thereof, are difficult to maneuver because of the lack of effective control mechanisms and are of an open cockpit design which exposes passenger and cargo to the elements, the vehicles heretofore known have been impractical and have not met with favor for commercial utilization.

The present invention, while utilizing the aforementioned ground effect principle, incorporates an aerodynamic body design which enables the vehicle to supersede surface obstacles which it encounters, which utilizes side plates to impart aerodynamic stability thereto, which shields passengers and cargo from the elements by an enclosed cockpit and which is provided with a thrust-producing mechanism mounted upon each side plate to impart facile maneuverability and high-speed operability thereto.

The apparatus of this invention is provided with suction-operated boundary layer control means and blowing means for producing an artificial stagnation point and an artificial trailing edge. These devices act to reduce drag and pitching moment, increase lift and render the machine highly maneuverable.

The ingested ambient is utilized to produce the artificial trailing edge and artificial stagnation point so as to minimize the mechanical power requirements of the vehicle and to further increase its efficiency.

An object of this invention is to provide an aerodynamically designed amphibious vehicle which operates on an air cushion and is highly maneuverable and capable of transcending surface impediments with considerable facility.

A further object of this invention is to provide an amphibious vehicle of practical design capable of carrying heavy loads at high speeds.

An additional object of this invention is to provide an amphibious vehicle incorporating the low power-to-payload ratio of a ground effect machine and the maneuverability of an aircraft.

A still further object of this invention is to provide an amphibious vehicle which has inherently high aerodynamic stability.

An accompanying object of this invention is to provide an amphibious vehicle which rides on an air cushion, is capable of heavier-than-air flight and which has low drag forces acting thereon.

Moreover, an object of this invention is to provide an aerodynamically designed amphibious vehicle wherein any interference which exists between components increases the lift-drag ratio.

Yet another object of this invention is to provide an amphibious vehicle which operates on an air cushion and has boundary layer control means to prevent separation of the ambient air stream from the vehicle surface when the vehicle takes on a large angle of attack.

An additional object of this invention is to provide a ground effect machine having a small radius of gyration about its principal axis such that the vehicle may be stabilized and controlled by relatively small trimming moments.

A still further object of this invention is to provide an amphibious vehicle having means for producing an artificial stagnation point and artificial trailing edge to reduce drag and pitching moment and increase useful lift.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figures 1, 2:
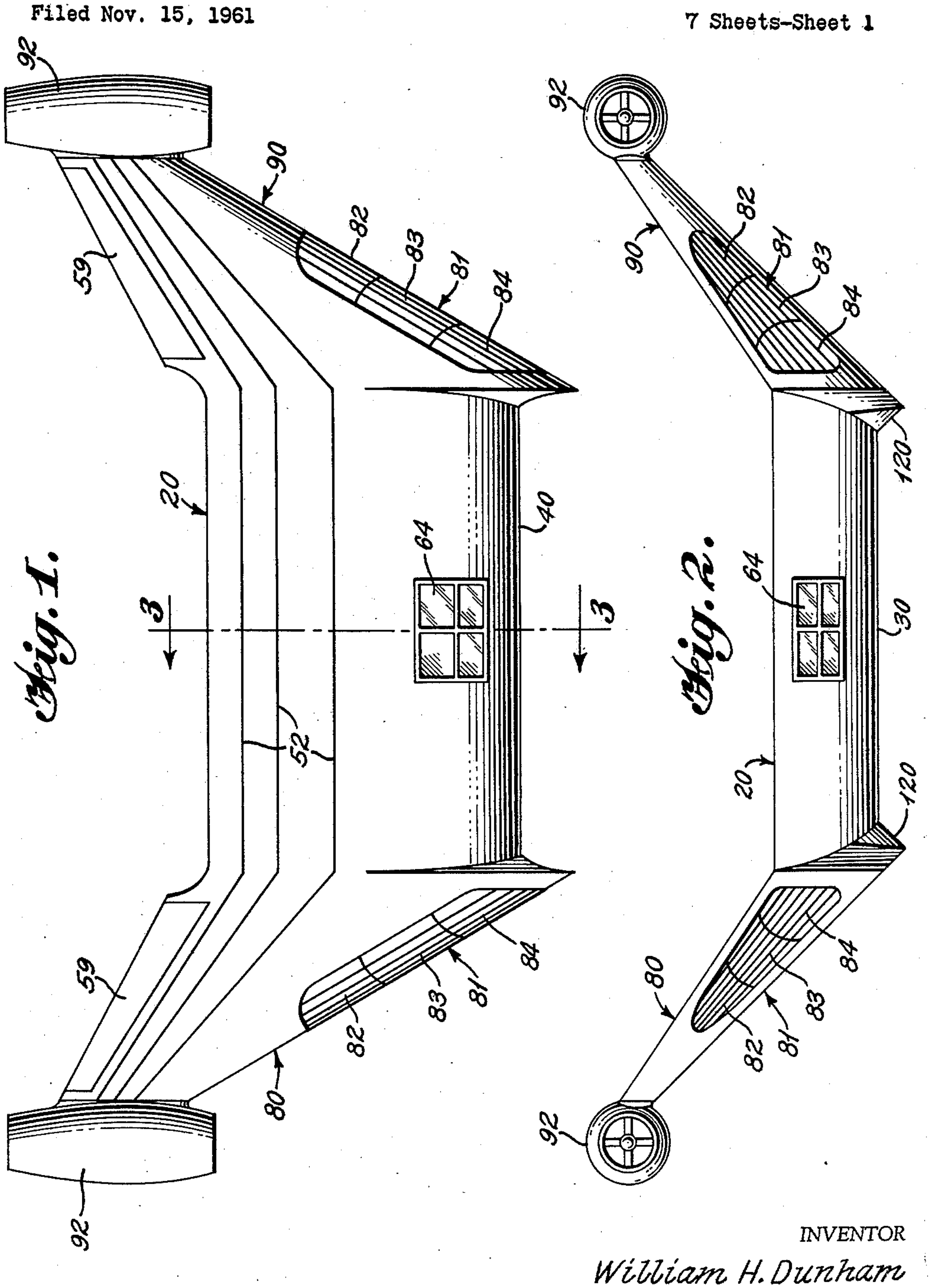
FIG. 1 is a top plan view of a preferred embodiment of this invention.
FIG. 2 is a front elevation of the embodiment shown in FIG. 1.

Referring now to the drawings, wherein like reference characters designate like or corresponding parts throughout the several views, there is shown in FIG. 1 which illustrates a preferred embodiment of this invention the hull or main body portion of the vehicle, which is of uniform cross section along its span and has the cross sectional shape of an air foil. This shape has a relatively flat bottom portion 30, a somewhat pointed front portion 40, a rounded top portion 50 and a blunt, rounded back portion 60.

The shape of the forward 70% of the top portion 50 of the instant embodiment is determined by the following Table A, but it is to be understood that the shape of the specific vehicle will depend on the vehicle chord and velocity and thereby on its Reynolds number. The purpose of utilizing this specific shape is to provide a linear velocity increase producing the lowest possible acceleration of ambient air.

The shape of the rear 30% of the top portion 50 of the vehicle is also a function of the chord of the vehicle and velocity and in the instant embodiment comprises a curved shape having an average slope of approximately 45° from the horizontal.

Figures 7, 8:
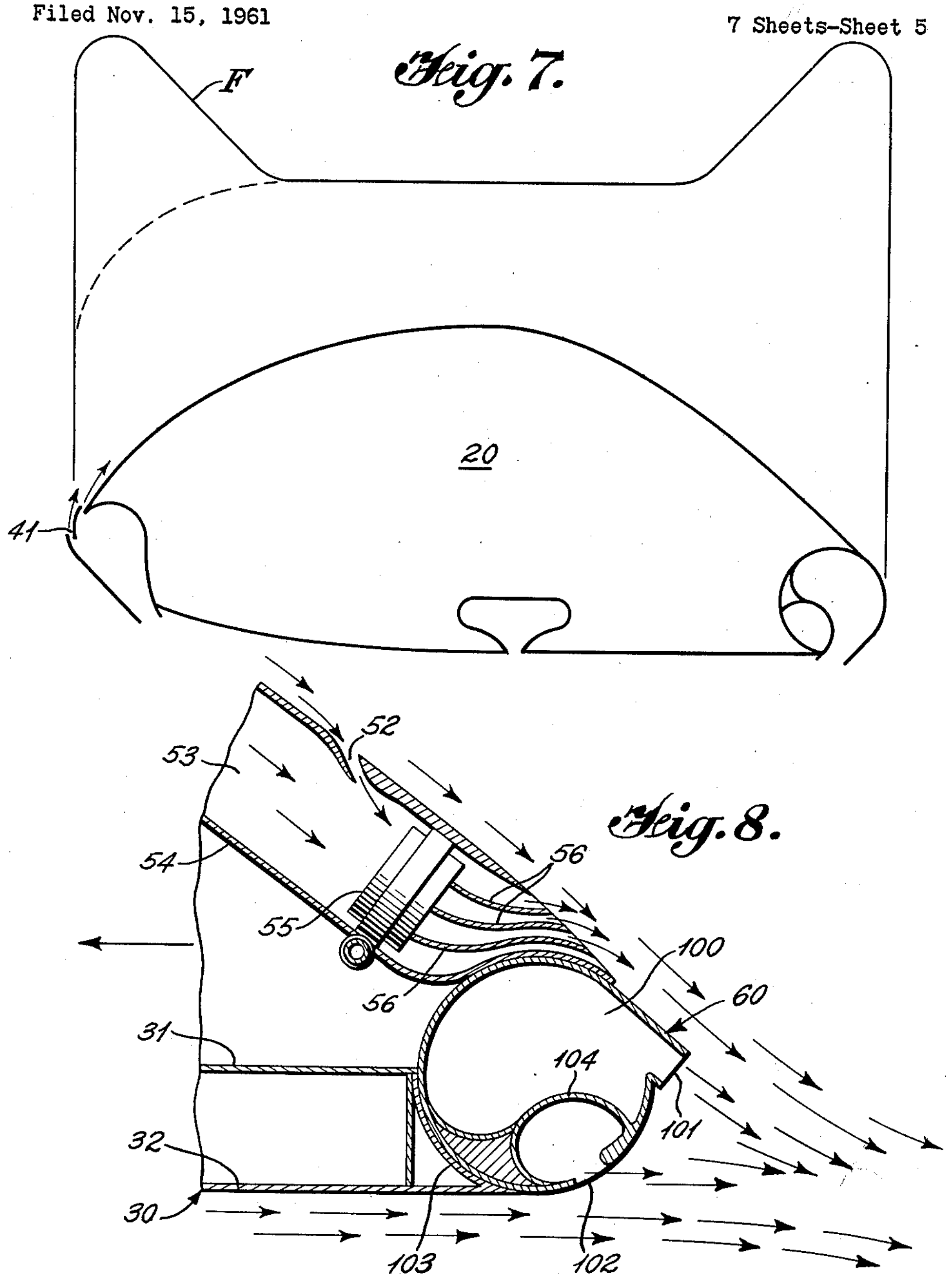
FIG. 7 is a diagrammatic representation of the velocity distribution across the hull.
FIG. 8 is an enlarged view of the tail end of the apparatus of FIG. 3 in position for producing an artificial trailing edge.

In Table A the X-coordinate is measured horizontally from point 41 in FIG. 7, the point of tangency of a vertical line with the nose 40 and is expressed as a percentage of the chord of the vehicle. The Y-coordinate is measured vertically from point 41 and is expressed as a percentage of the chord of the vehicle.

*Table A*

| X (Percent): | Y (Percent): |
|---|---|
| 00.000 | 00.000 |
| 00.110 | 00.979 |
| 00.461 | 02.220 |
| 01.820 | 04.900 |
| 03.969 | 07.739 |
| 06.838 | 10.626 |
| 10.363 | 13.468 |
| 14.472 | 16.180 |
| 19.085 | 18.683 |
| 24.113 | 20.910 |
| 29.458 | 22.801 |
| 35.013 | 24.298 |
| 40.669 | 25.359 |
| 46.307 | 25.944 |
| 51.805 | 26.020 |
| 57.033 | 25.557 |
| 61.845 | 24.524 |
| 66.053 | 22.866 |
| 69.310 | 20.467 |
| 69.614 | 20.103 |
| 69.883 | 19.723 |
| 70.109 | 19.320 |
| 70.278 | 18.908 |
| 70.364 | 18.476 |
| 70.288 | 18.063 |
| 70.206 | 17.966 |
| 70.073 | 17.842 |

Located on each side of the hull is a stabilizing side plate, one of the side plates being designated 80 and the other 90. The side plates are directed outwardly from the hull portion 20, at an angle of approximately 45° from the vertical, and are swept rearwardly at an angle of approximately 60° from the center line of the hull. The side plates 80 and 90 are each of generally triangular shape, and are each twisted from the main center section to the root tip. The angular twist is approximately 2°. The stabilizing side plates are also tapered from the main center section of the side plates toward the tip of the side plates, and the ratio of taper of the main center section to the tip is approximately 5:1.

The geometric aspect ratio, the ratio of the span to the chord, is approximately 3. The chord of the vehicle is 20 ft. and the span of the vehicle is approximately 60 ft. A thickness-to-chord ratio of approximately 40 percent is utilized, and the thickness of the vehicle is thereby approximately 8 ft. The free floor space provided in this vehicle is about 12 ft. x 36 ft. and would enable the vehicle to carry about 50 people.

Located on the bottom of the hull of the vehicle are the air ducts which supply ingested air from the interior of the vehicle to the under portion of the vehicle for the purpose of forming an air cushion. These ducts comprise a rear or trailing edge duct 100 located along the back portion 60 of the hull, a nose or leading edge duct 110 located along the front portion 40 of the hull, a pair of side ducts 120, one side duct being located on either side of the hull within the side plates 80 and 90, and six stabilizing ducts generally designated 130 located within the peripheral boundary determined by the peripheral ducts and which serve to divide the air cushion under the hull into compartments.

Figure 3:
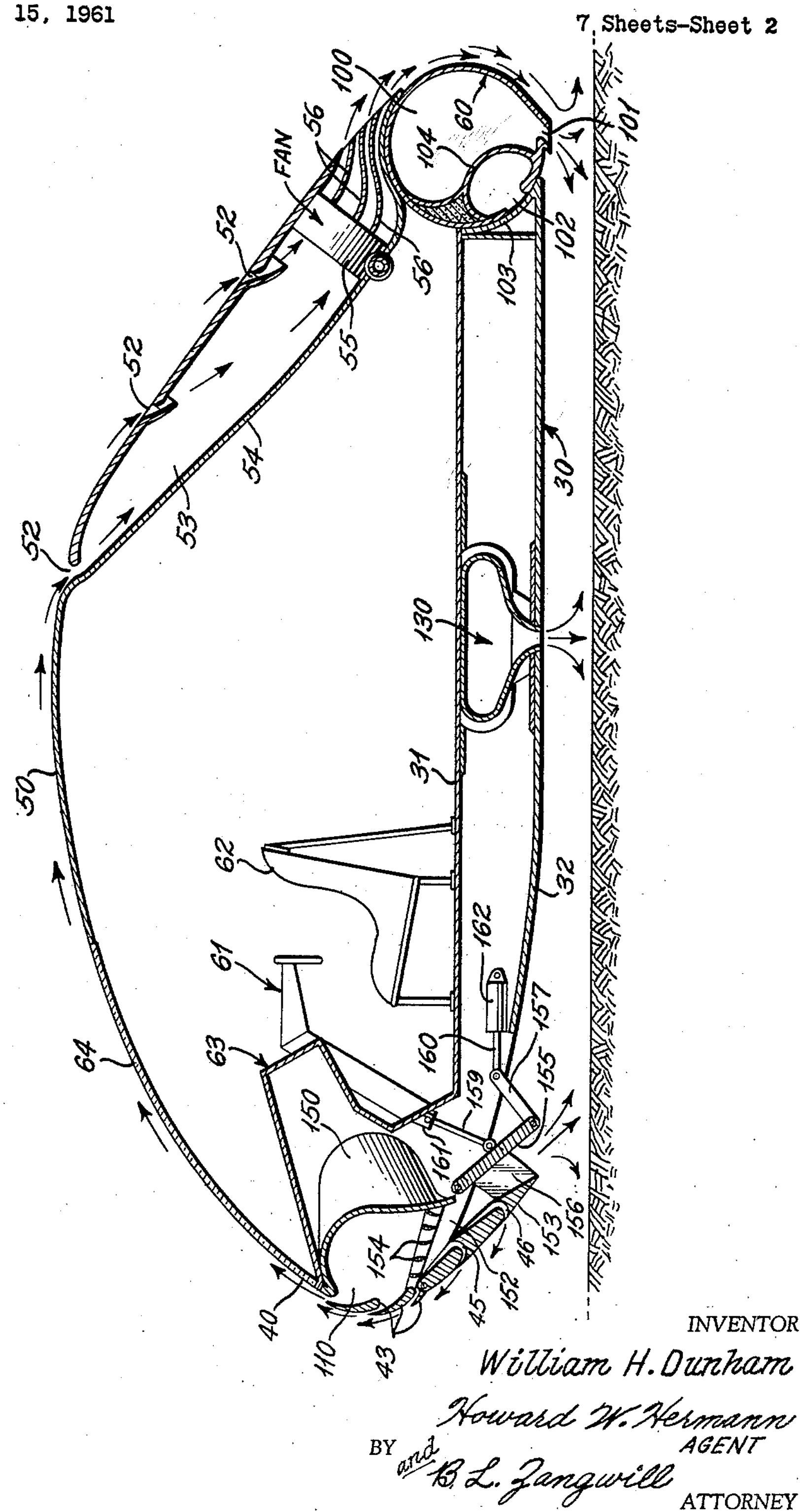
FIG. 3 is a cross-sectional view taken along line 3—3 of FIG. 1.

The nose duct 110, as best seen in FIG. 3, comprises an elongated duct 150 of partly circular cross section, the cross section of duct 150 decreasing in area from one side of the hull to the center of the hull at a rate of thirty-six square inches per foot of duct length and symmetrically increasing in area from the center of the hull to the other side of the hull. Located along the bottom portion of the nose duct is a jet exhaust opening or air exit passage 152 which extends throughout the length of said duct. Located within said exhaust passage are a plurality of curved turning veins 154, which serve to channel and direct the air outwardly from the duct in such a manner as to substantially eliminate turbulent flow and the energy loss and other deleterious effects resulting therefrom.

Pivotally mounted on each side of the jet exhaust opening 152 is a guide arm, the arms being designated 153 and 155. The guide arms channel the flow of air from the nose duct of the vehicle downwardly and inwardly toward the undercarriage of the vehicle to act in the formation of the air cushion. The guide arms 153 and 155 are respectively supported by means of struts or links 156 and 157 and may be raised and lowered by means of their respective hydraulic cylinders 161 and 162, through the action of pivotally connected pistons 159 and 160. The guide arms 153 and 155 may be moved with respect to each other by operation of the cylinders to allow adjustment of the opening formed thereby. The hydraulic cylinders are located in the space on the bottom of the hull between the floor members 31 and 32 which define the base of the cockpit and the underportion of the hull respectively. Actuation of the hydraulic cylinder will thereby enable lowering and raising of the guide arms by means of the linkage system so that the guide arms do not provide any hindrance to aerodynamic flow when the vehicle is in or approximating free flight.

A pair of curved channels 45 and 46 are formed in the guide arm 153. These channels 45 and 46 act to direct a portion of the ingested air flowing between the guide arms up and around the nose of the vehicle.

Located in the front portion of the nose duct are a plurality of curved air-jet guide veins 43 which are spaced from each other in order that part of the flow through the nose duct is directed through the guide veins 43 and around the front of the hull to combine with the flow through channels 45 and 46 and create an artificial stagnation point of the ambient flow which is located beneath the channel 46 in order to prevent a harmful pressure distribution across the cross section of the hull during forward motion of the vehicle.

Located at the rear 60 of the vehicle is the rear or trailing edge duct 100, which operates in one position to supply air from the interior of the vehicle to the rear under-portion of the hull, as shown in FIG. 3, to assist in the formation of an air cushion beneath the vehicle. The trailing edge duct is of circular cross section, and the cross sectional area linearly diminishes at a rate of thirty-six square inches per foot of duct length from one side of the duct 100 to the center of the duct and then linearly increases at the same rate so that the duct cross sectional areas at both ends are equal. The trailing edge duct has two air exhaust ports 101 and 102, of which port 101 is the main exhaust port and port 102 is the secondary exhaust port. During normal operation upon the air cushion, the trailing edge duct is in the position shown in FIG. 3, wherein the secondary exhaust port 102 is sealed off and the main exhaust 101 exits beneath and inwardly of the hull portion of the vehicle so as to assist in the formation of the air cushion beneath the vehicle. The trailing edge duct is rotatably mounted within bushing 103 and it may be rotated through approximately 60° from the horizontal to the position of FIG. 8 when the vehicle transcends from the air cushion flight condition to the aerodynamic flight condition. In the latter position air flow through the main trailing edge duct exits at approximately a tangent to the top portion of the hull such that it acts as a continuation of the flow along the top of the rear portion of the hull of the vehicle; in this position the secondary trailing edge duct flow exits at an angle of approximately 45° with respect to the main trailing edge duct exhaust so that the resultant flow caused by the interaction of the trailing edge duct and secondary duct flows is directed away from the rear end of the vehicle as seen in FIG. 8. The internal portions of the ducts 101 and 102, which are separated by wall 104, are all curved so that no sharp corners are formed in order to minimize turbulent flow and thereby prevent any energy dissipation within the ducts as would normally result therefrom.

The side ducts 120 which extend within the side plates along either side of the hull between the nose duct and the trailing edge duct each have constant cross sections throughout their lengths, the shape of the cross section being somewhat elliptical and opening beneath the vehicle through downwardly facing lips. The lips act to channel flow of ingested air to the under portion of the hull so as to assist in the formation of the air cushion.

Figure 4:
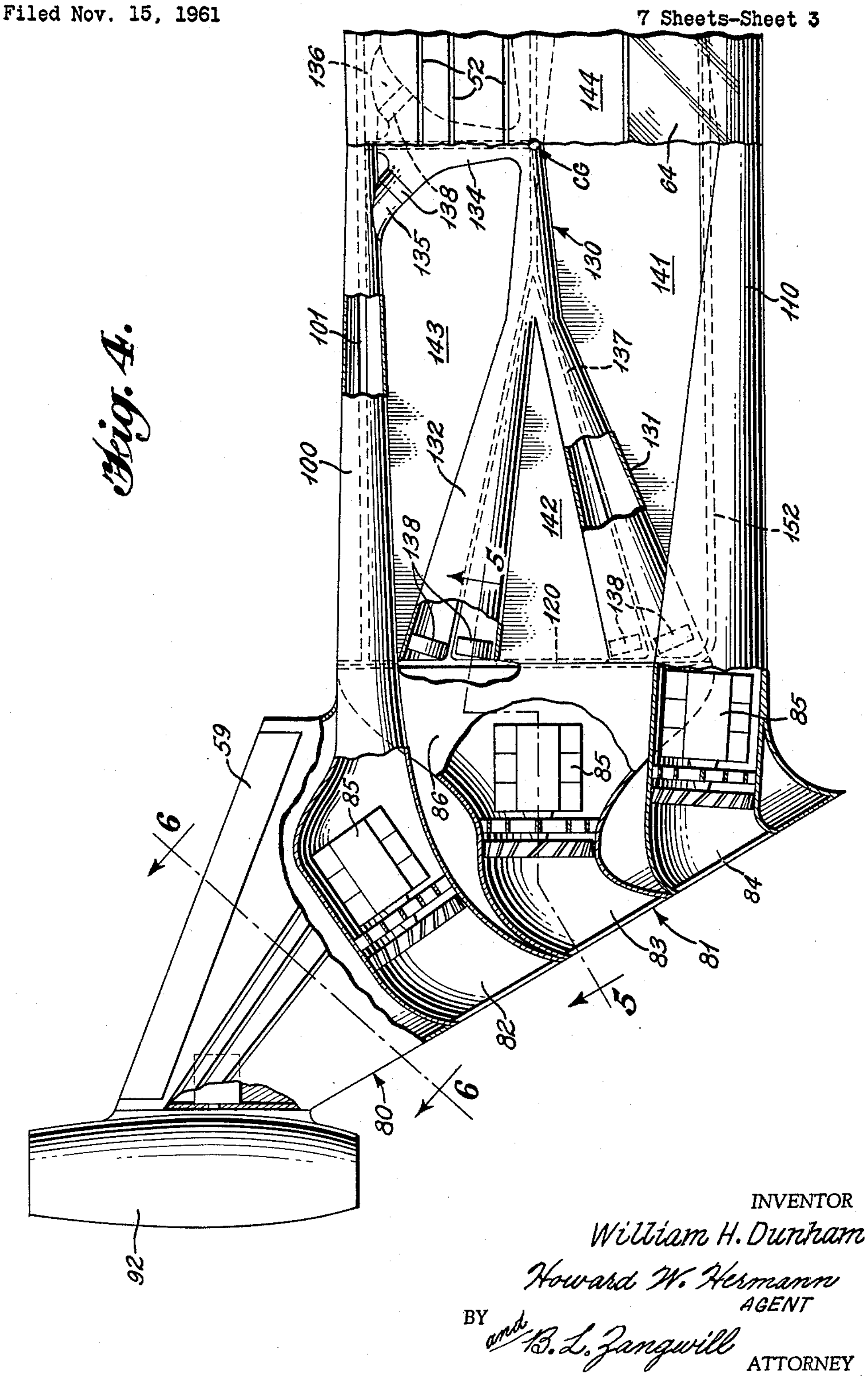
FIG. 4 is a fragmentary top plan view partially in section showing the ducting.
Figure 5:
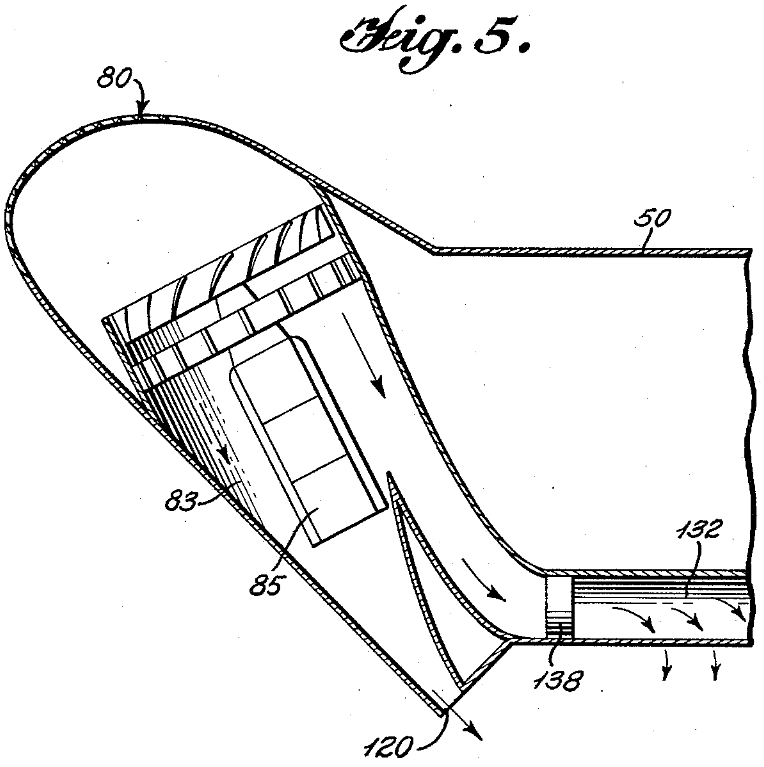
FIG. 5 is a view taken along line 5—5 of FIG. 4.

Within the boundary of the undercarriage of the hull defined by the peripheral air ducts, as best seen in FIG. 4, there is an additional unit of stabilizing air ducts 130. This unit consists of a pair of ducts 131 and 132 of somewhat elliptical cross section which extend from a side of the undercarriage of the hull toward the center of the hull and merge at a point about three-quarters of the distance from a side of the hull toward the center of the hull to form a single base duct 133, the composite unit being of a Y-shape. A similar unit (not shown) is positioned on the opposite side of the hull and the base ducts of the two units are interconnected to form a unitary system. At right angles to the interconnected portion of the stabilizing duct and communicating therewith a duct 134 of generally Y-shape is connected at its base to the stabilizing duct such that it is supplied with ingested air therefrom. The branch portions 135 and 136 of duct 134 discharge into secondary exhaust port 102. All of the aforesaid stabilizing ducts diminish in cross section at a rate of thirty-six square inches per foot of duct length from the side of the hull to the center of the hull. In the base portion of each of the ducts the ducts are lipped to form a jet nozzle 137 to enable exhaust of the ingested air to the under portion of the hull in order to provide stabilization of the air cushion. Turbine driven fans 138 are located within the stabilizing ducts to boost the pressure of the ingested air therein so as to compensate for pressure drops along the ducts and the higher back pressure under the hull. The afore-mentioned stabilizing duct system 130 separates the undercarriage of the hull into a large forward section 141 of generally trapezoidal shape, a pair of small side sections 142 of generally triangular shape and a pair of intermediately-sized rear sections 143 having a somewhat triangular shape.

Extending across the top rear portion of the hull 20 and up the side plates 80 and 90 approximately two-thirds of the total length of the side plates, there are provided a plurality of boundary layer control slots 52. The boundary layer control slots comprise a series of spaced ducts for the purpose of channeling boundary layer air contiguous with the upper rear portion of the hull into a conduit 53 within the hull and exhausting the ingested air so as to prevent any harmful effects. That portion of the boundary layer conduit 53 which is formed in the side plates is provided with a duct (not shown) to channel ingested air to the elevons 59 to aid in the steering of the vehicle as more fully described infra. The conduit 53 is defined by the upper rear walls of the hull and side plates and a channel member 54. Several turbine driven fans 55 are mounted in the exit portion of the boundary layer conduit 53 for the purpose of creating a suction force in conduit 53 to aid in the ingesting of ambient air into the conduit. The boundary layer conduit 53 is provided with a plurality of streamlined curvilinear veins 56 located downstream of the fans which serve to channel the ingested air without causing any turbulent flow thereby preventing undue energy dissipation. The boundary layer control slots in the hull discharge the ingested air over the trailing edge of the vehicle.

In the front portion of each of the side plates there is located a large scoop 81 of generally oval shape the purpose of which is to ingest ambient air for operating the various vehicle air flow devices. Within each scoop there are located three conduits, each of which supplies several of the air ducts with ambient air. The conduits are of somewhat circular cross section. Each of the conduits has provided in the forward portion thereof a turbine-driven fan 85. The purpose of the turbine-driven fans is to aid in the ingesting of ambient air, and to transfer sufficient energy to the air to enable the air to exhaust through the air-cushion-forming ducts at a pressure which is adequate to support the vehicle. Conduit 84 supplies the nose duct 110 with ingested air, conduit 82 supplies the trailing edge duct 100 with ingested air and the conduit 83 supplies the stabilizing ducts 130 and the side ducts 120 with ingested air. The turbine driven fans 138 in ducts 131 and 132 are provided to step up the pressure of the stabilizing duct air which undergoes a substantial pressure drop in the diffuser nozzle 86 of conduit 83. The turbine driven fans 138 are mounted in ducts 135 and 136 for the purpose of compensating for pressure drops in these ducts due to friction and compensate for the increased back pressure under the craft.

Figure 6:
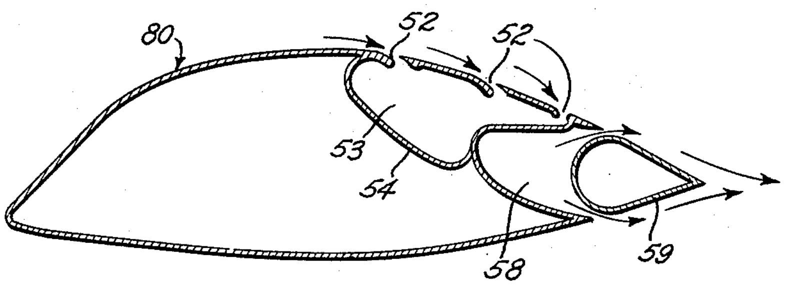
FIG. 6 is a view taken along line 6—6 of FIG. 4.

An elevon or rudder 59 is pivotally mounted on the rearward portion of each of the side plates 80 and 90 for assistance in steering the vehicle. Each of these elevons extends along substantially the entire rear edge portion of the side plates and is of a teardrop shape in cross section, as best seen in FIG. 6, the cross section being constant along the length of the elevon. The elevons are rotatably mounted in the side plates and they may be moved in unison or relative to each other by conventional mechanical or electromechanical means (not shown). For use in steering the vehicle when the speed of the vehicle is such that the ambient flow around the vehicle is insufficient to afford adequate control of the vehicle, an air duct (not shown) interconnects boundary layer conduit 53 and elevon conduit 58 to supply ingested air which is directed around elevons 59. A valve means (not shown) is provided in the air duct to cut off flow into conduit 58 when ambient flow is adequate to steer the vehicle.

Figure 9:
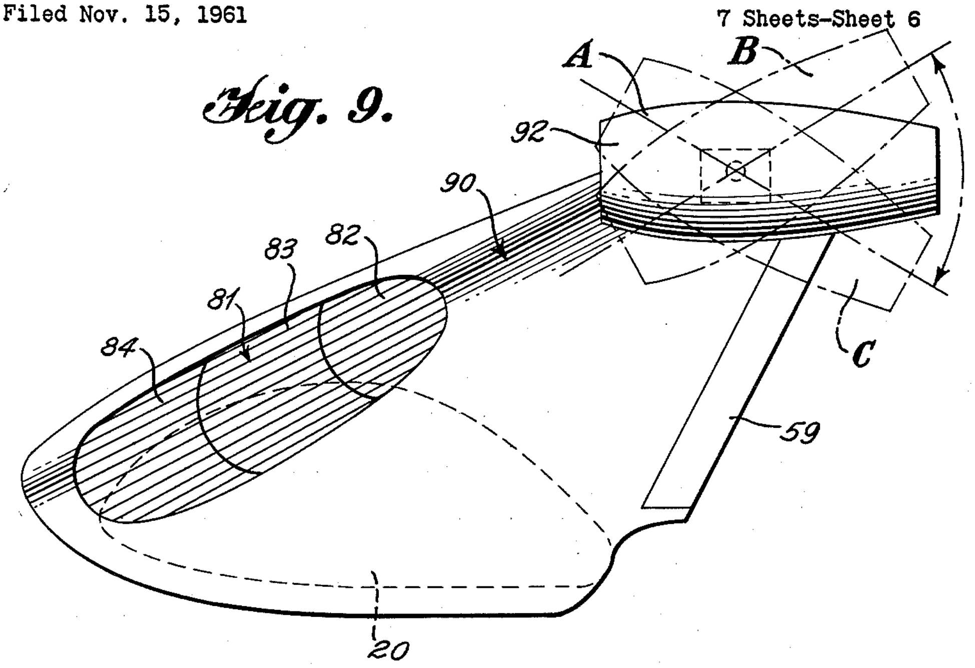
FIG. 9 is a side elevation of the mechanism of FIG. 1 showing in phantom various positions of the thrust-producing mechanism.

Rotatably mounted on a shaft 93 in the tip of each of the side plates is a jet engine, ducted fan or the like 92 the purposes of which are to provide the vehicle with translatory motion and to aid in steering and braking the vehicle. These engines are provided with conventional control means (not shown) so that they may be moved in unison or with respect to each other to positions as shown in FIG. 9 for the purpose of providing thrust to the vehicle in order to change the angle of attack of the vehicle or as an additional means of steering the vehicle.

Within the vehicle, in the cockpit space 61 there are provided appropriate seating means 62 for the purpose of providing seating facilities for the crew of the vehicle, and a control panel, instrument panel and steering mechanism generally designated 63 for the purpose of operating the vehicle. The pilot controls are constructed to operate the rudders, engines, air ducts and the like by conventional electrical, mechanical or electromechanical means which are old in the art and which form no part of this invention. The remaining part of the vehicle cabin, which is unoccupied by seats and instruments may be utilized for the purpose of transporting and storing cargo and/or passengers. The outer shell member 64 of the vehicle in front of the pilot seat is constructed of plexyglass or the like so as to provide a window through which the pilot may look while navigating the vehicle.

Figure 10:
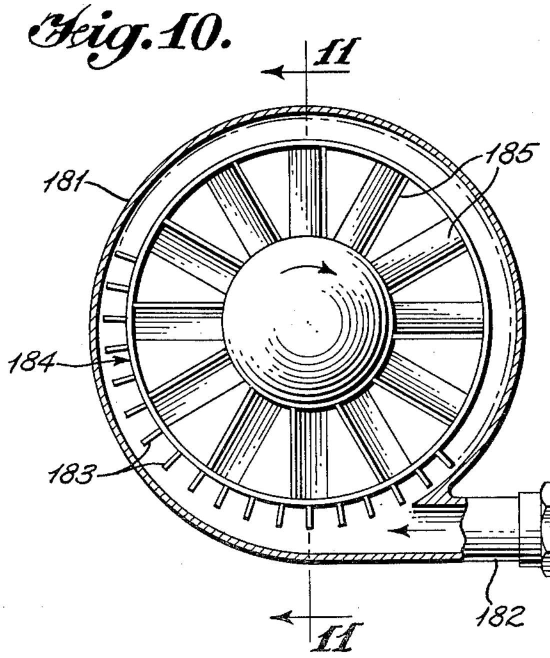
FIG. 10 is a detail view of a turbine utilized in the instant invention.
Figure 11:
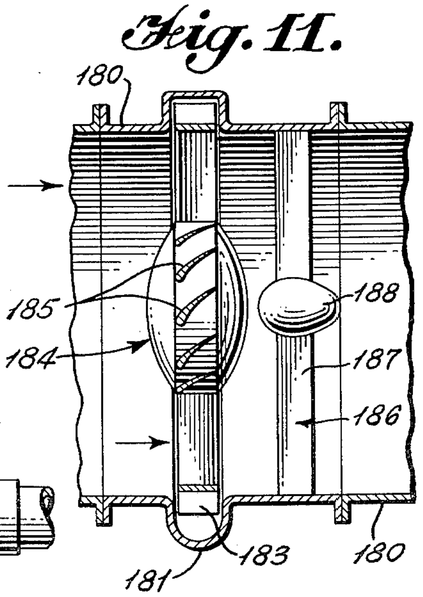
FIG. 11 is a section taken along the line 11—11 of FIG. 10.

The turbine shown in FIGS. 10 and 11 is seen to comprise a turbine housing 180 having a rotor housing 181 formed therein. An air inlet 182 supplies air to the rotor housing, which air impinges on the impeller blades 183 of the rotor 184. Members 185 constitute the rotor blades and the stator 186 has stator blades 187 mounted upon hub 188. This mechanism comprises a conventional turbine and forms no part of this invention.

Figure 12:
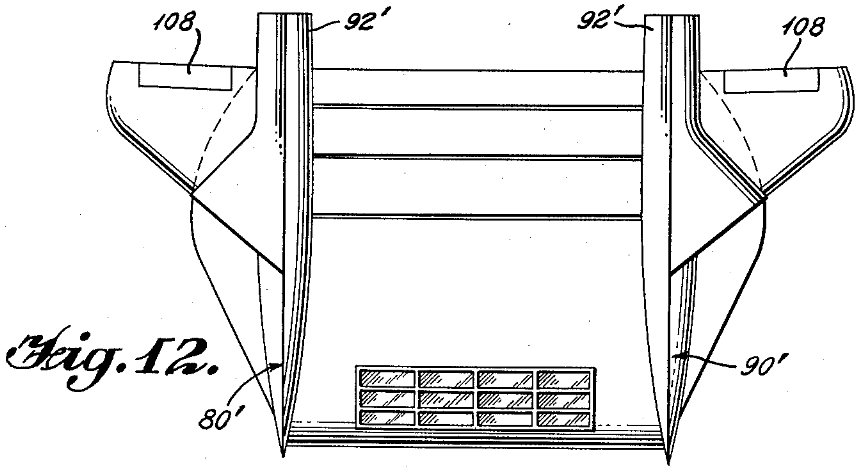
FIG. 12 is a top plan view of another embodiment of the invention.
Figure 13:
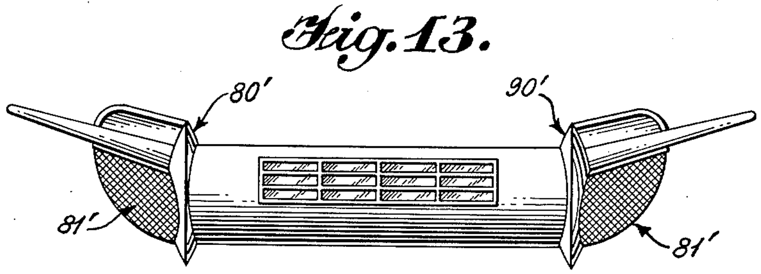
FIG. 13 is a front elevation of the embodiment shown in FIG. 12.
Figure 14:
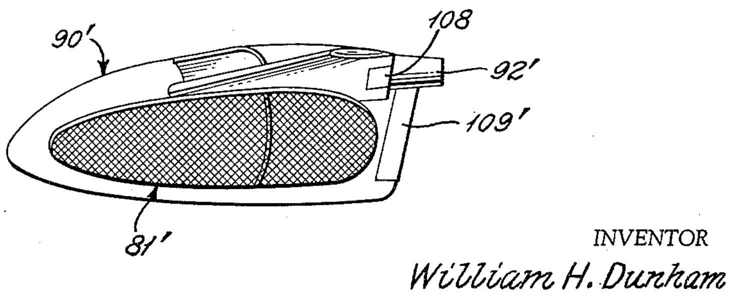
FIG. 14 is a side elevation of the embodiment shown in FIG. 12.

A second embodiment of the invention is shown in FIGS. 12, 13 and 14. The major distinction between this embodiment and that shown in FIGS. 1 and 2 resides in the fact that the side plates 80′ and 90′ are positioned in vertical planes, rather than being inclined with respect to the vertical as is true of the embodiment of FIGS. 1 and 2. A scoop 81′ is located in the front of each side plate for the purpose of ingesting ambient air to supply the blowing controls for rudder 109, elevon 108 and for the air cushion. Jet engines 92′ or the like are mounted on side plates 80′ and 90′ to provide translatory propulsion means for the vehicle. Inasmuch as the vertical side plates of the embodiment of FIGS. 12–14 provide a smaller surface area in the direct path of ambient flow the skin friction drag upon the vertical side plates will be less than upon the inclined side plates. However, due to the smaller geometric aspect ratio of the vertical side plate machine resulting from its smaller span the increase in induced drag will exceed the reduction in skin friction drag. Therefore, the vertical side plate machine will require more power in order to operate at speeds comparable to the inclined side plate machine since a greater drag force must be overcome by the motive power thereof. Since the aspect ratio is the ratio of the span to chord, and since, for machines having the same hull size, the span of the inclined side plate machine is greater than that of the vertical side plate machine (the span being the distance between the tips of the side plates), therefore, the aspect ratio of the inclined side plate machine will be greater than that of the vertical side plate machine, and consequently the induced drag of the inclined side plate machine will be smaller than that of the vertical side plate machine since the induced drag is inversely proportional to the aspect ratio. Furthermore, because the vertical side plate vehicle requires separate elevons 108 and rudders 109 for the steering thereof, the manipulation of the craft is more cumbersome than that of the inclined side plate machine which utilized the more easily manipulated elevator.

The specific utility of the vertical side plate machine occurs in situations where a machine has a relatively large ratio of load carrying capability to span. For navigation on rivers, lakes and the like or for beach landing purposes a small craft would be preferable because of the limited expanse of surface over which the vehicle may travel. Therefore, since a vertical side plate machine has a larger, wider hull than an inclined side plate machine having the same span would have, it is obvious that the vertical side plate machine would have more cargo or passenger space.

The boundary layer control slots 52 serve the purpose of ingestine low energy air from the boundary layer at the rear portion of the vehicle. Air moving across the top of the vehicle and which is at zero velocity at the surface of the vehicle acts to produce a slowing effect on the adjacent air as the latter moves from the nose of the vehicle to the maximum velocity point, i.e. the apogee of the hull cross section. The pressure gradient from the nose to the maximum velocity point is negative and thus acts to assist the flow of boundary layer air. However, from the maximum velocity point rearwardly to the trailing edge the pressure gradient is positive since the pressure must increase to the pressure of the atmosphere at the trailing edge. This positive pressure gradient acts to retard the movement of the boundary layer air, to produce a separated flow which causes a momentum drag caused by the suction of the low velocity air from the wake past the trailing edge to the maximum velocity point which greatly hinders forward motion of the machine. Therefore, in order to obviate this effect the turbine-driven fans 55 located in the boundary layer control conduit 53 are for the purpose of ingesting the low velocity air in the boundary layer. By removing this low velocity air the deleterious momentum drag which is a concomitance thereof is also removed. The ingested boundary layer air is exhausted to the atmosphere over the outer surface of the trailing edge duct, thus maintaining the high velocity and low pressure of the air over the entire chord. The exhausting of this ingested air along the trailing edge enables the energy of this exhaust air to be dissipated against the ground rather than within the vehicle.

In machines of the instant type having thickness to chord ratios of the order of 20 percent or less, the boundary layer control mechanism is not necessary. The reason for this is that the shape of the surface of a vehicle having such a low thickness to chord ratio produces a lower positive pressure gradient because of the smaller slope of the rear surface and therefore the flow of air about the vehicle is maintained contiguous therewith. Obviously, if there is to be ample room in the vehicle for passengers to stand and to be able to load cargo to any substantial height, such a vehicle would have to be rather long, approximately thirty feet or more, in order for the vehicle to be reasonably efficient in operation without the use of the boundary layer control mechanism.

The air cushion or bubble which is created by the air flow through the ducts on the undercarriage of the vehicle serves as a support for the vehicle, inasmuch as the vehicle is supported thereupon rather than upon the surface over which the vehicle travels. The air cushion greatly reduces the power required for translatory motion of the vehicle since there is a smaller coefficient of friction between the bottom skin of the vehicle and the air adjacent thereto than there would be between the vehicle bottom and land or sea surface over which it would otherwise travel, and higher velocity travel of the vehicle is accordingly made possible, thereby enabling reduction of wave drag when traveling over water.

The side ducts 120, the leading edge or nose duct 110 and the trailing edge duct 100 act in combination to form a peripheral air curtain around the bottom of the vehicle. The stabilizing ducts 130, which are located within the peripheral air curtain, serve to compartment the air bubble, thereby preventing any rushing of the air from one side of the vehicle to another side upon rolling or pitching movement of the vehicle. The undercarriage ducting system is so constructed that there are no right angle corners formed by the ducts, but rather rounded corners are formed so that there are no pressure losses due to turbulent flows set up in the corners. Were right angle corners to be used, the resulting pressure losses would have to be overcome by additional power of the duct fans.

All of the ducts are tapered toward their respective centers. The reason for this is that a steady flow of air is supplied to each duct by the air scoop conduits 82, 83 and 84. Were the ducts to be of uniform cross section throughout their lengths, the loss of air through the jet exhaust openings would cause a diminution of the flow through the conduit toward the center of the hull, thereby resulting in a pressure gradient from either end of the duct toward the center. Therefore, in order to maintain a constant exhaust pressure along the duct, the duct is tapered toward its center to compensate for the diminished flow along the duct.

In determining the necessary duct taper or rate of change of cross sectional area, the jet exhaust opening multiplied by one foot length indicates the change in area which must be produced by the duct taper per foot. Therefore, since the jet exhaust openings are constructed to be three inches, the decrease in cross sectional area of the duct per foot of duct length will be thirty-six square inches. This figure may, of course, vary for different ideal jet openings for different sized vehicles.

The stabilizing jet system 30 must be operated at a considerably higher pressure than the peripheral jet system. This is necessary because the pressure beneath the craft is much greater than atmospheric pressure outside the lifting air cushion. Therefore, the peripheral exhaust jets at 100, 110 and 120 need only exhaust into a pressure gradient which varies linearly from atmospheric pressure to the value of the pressure within the air cushion, i.e. the peripheral jets exhaust into a mean back pressure which is of a value approximately halfway between the atmospheric pressure and the air bubble pressure. However, the stabilizing jet system must exhaust into a back pressure of the total air-cushion pressure. Therefore, in order to maintain adequate jet momentum the pressure of the stabilizing duct system must be at least twice the magnitude of the pressure in the peripheral ducting system. To achieve this increased pressure, the booster fans 138 are located in the stabilizing ducts, to bring the stabilizing duct pressure up to the amount required for proper operation of the vehicle.

The trailing edge duct 100 serves two purposes. When the vehicle is in the hover position shown in FIG. 3, the trailing edge duct exhausts ingested air to the ground through its primary jet exhaust opening to aid in the formation of the air cushion. When the vehicle is in flight, i.e. when the aero-dynamic lift upon the vehicle is such that the air cushion is no longer necessary to maintain a hiatus between the under portion of the vehicle and the surface over which the vehicle travels, the trailing edge duct is rotated approximately 60° to the position shown in FIG. 8. This position of the duct enables the air flowing through the primary jet exhaust opening 101 to exit at an angle of approximately 45° from the horizontal. In this position the secondary trailing jet opening 102 is no longer sealed off from the atmosphere and the ingested air from ducts 135 and 136 flowing therethrough exits substantially horizontally to the atmosphere. These two flows impinge upon each other to provide a resultant artificial trailing edge flow of air around which the flow of the ambient air is caused to flow. This feature enables the vehicle to operate at substantial distances from the surface without being subjected to an undesirable drag force. This drag force would normally occur if the trailing edge of the vehicle was round and in the absence of an artificial trailing edge, since the flows from below and above the craft would mix and separate in the wake of the vehicle thereby causing vortices and other turbulent, energy absorbing flows to occur, thereby occasioning the undesirable drag force. This construction also provides compensation of the negative pitching movement normally present while operating the vehicle away from the surface.

The purpose of the air jet guide veins 43, 45 and 46 located in the forward end of the leading edge or nose duct 110 is to direct a portion of the air in the leading edge duct out of the duct in a direction opposite to that of the ambient air flow. This prevents the stagnation point of the flow from being located above the center line of the hull form and locates it below the channel 46. Since the stagnation point of the flow would normally be above the hull center line and since the trailing edge jet produces a very low pressure area along the rear of the hull form, a resulting negative (or nose down) pitching moment will be produced. This is of course undesirable since stability of the vehicle in the horizontal plane is desired, and if there was no artificial stagnation point produced a drag-producing trimming device such as a tail would be necessary to compensate for this negative moment. This pressure distribution is illustrated in FIG. 3 wherein the dotted line represents the pressure distribution along the front of the hull when no artificial stagnation point is produced. However, by using the air exhaust device of FIG. 3 the stagnation point will be located below the exhaust jet nozzle or channel 46 and the ambient air is forced to expand about the nose by the exhausted ingested air, thereby creating a low pressure area over the nose to nullify the negative pitching moment at the trailing edge. This feature will substantially improve the efficiency of the machine by eliminating the need of any positive moment trim.

When the vehicle is travelling along a surface upon the air cushion and an obstacle blocks the forward motion thereof, in order to transcend the obstacle and obviate any unwieldy movement of the vehicle around the obstacle, the engines 92 mounted on the side plates are simultaneously rotated counterclockwise from position A to position B shown in FIG. 9 such that a clockwise moment is produced at the nose of the vehicle by the reaction force and the vehicle is caused to take on a steep angle of attack. The kinetic energy accumulated by the forward motion of the vehicle assists in raising the vehicle above the ground and is thereby converted into potential energy. When the vehicle has reached the desired height the side plate engines 92 are rotated to position A wherein the vehicle will move straight forward and the airfoil shape of the hull combined with the drag-reducing boundary layer control mechanism will produce a saddleback velocity distribution along the hull similar to that shown by curve F in FIG. 7 which will cause the vehicle to remain in free flight until such time as the side plate engines are rotated to position C whereby the vehicle will take on a negative angle of attack and the engines are then rotated to position A to straighten out the flight of the vehicle at the desired level above ground.

When the vehicle is in free flight steering may be accomplished by slowing down one side plate engine more than the other so that the differential engine thrusts will produce a resulting moment which will rotate the vehicle in a horizontal plane, the direction of rotation being dependent upon which engine is producing the lesser thrust. The side plate engines may also be inclined with respect to each other so that their thrust lines are in different planes to provide a differential moment to bank the vehicle. When the vehicle is hovering on the air cushion the side plate engines may be used to brake the vehicle by reverse pitching the propellers, and the vehicle may be steered by merely letting one engine idle while the other engine is running at a higher speed.

Steering of the vehicle may also be accomplished by means of the elevons 59 of the embodiment of FIGS. 1 and 2 or the rudders 109 and elevons 108 of the embodiment of FIGS. 12, 13 and 14. When the translatory velocity of the vehicle is insufficient for ambient air flow over the elevons or elevons and rudders of the vehicle to provide a steering force, the ingested air from the side plate boundary layer control slot conduit 53 or any other convenient source is channeled into conduit 58 and over the rudder mechanism to provide an artificially produced ambient flow over the rudders thereby enabling effective low speed steering of the vehicle.

The air foil shape of the hull, and the swept-back side plates combine to locate the three dimensional center of pressure of the vehicle aft of the center of gravity. Since the three-dimensional center of pressure is by definition the center of pressure or the point at which the resultant of all aerodynamic forces act on the vehicle the location thereof behind the center of gravity provides a restoring moment which brings the vehicle into the wind when it is pitching or yawing. Stability in roll of the vehicle is brought about by the side plates. When the vehicle rolls one side plate becomes more horizontal or flatter and the other side plate becomes more vertical. Whichever side is flatter will have a greater lift because of the greater vertical normal force component, thereby providing a restoring force which will act to right the vehicle when it rolls.

In order to eliminate the need of boundary layer control slots in the tips of the side plates, a thickness to chord ratio of twenty percent or less at the center portion of the side plate must be maintained in order to prevent boundary layer drag and stalling. Since the thickness to chord ratio at the hull is about forty percent and since the chord taper ratio is about five to one, the thickness taper ratio must be about ten to one.

Various modifications are contemplated and may obviously be resorted to by those skilled in the art without departing from the spirit and scope of the invention, as hereinafter defined by the appended claims, as only preferred embodiments thereof have been disclosed.

Having thus described the invention, what is claimed is:

1. An amphibious vehicle comprising a hull having a substantially rectangular cross section in a first plane and an airfoil-shaped cross section in a plane normal to said first plane and having a leading edge, a base and a trailing edge, a pair of side plates, one being mounted on each side of said hull between said leading edge and said trailing edge, a channel member located within said hull and spaced from the leading edge, said channel member being sealedly connected to said leading edge to form a leading edge duct, said duct defining an exhaust port having a front edge and located proximate the base of said hull, a guide arm mounted on each edge of said exhaust port to direct flow beneath the vehicle, said leading edge being further characterized by a plurality of guide veins adapted to direct part of the flow in said duct up around the exterior of the vehicle, the guide arm mounted on said front edge of the exhaust port defining a plurality of spaced, curved guide ports adapted to direct part of the flow between said guide arms up around the vehicle exterior whereby the stagnation point of ambient flow about the leading edge of said vehicle is located below the lowermost guide port, and a series of peripheral duct means including said leading edge duct and mounted in the base of said vehicle to discharge air downwardly and beneath the vehicle to form a supporting air cushion when the vehicle is in proximity to an underlying surface.

2. An amphibious vehicle comprising a hull having a substantially rectangular cross section in a first plane and an airfoil-shaped cross section in a plane normal to said first plane and having a base, a trailing edge and a leading edge, a pair of swept-back divergent side plates, one being mounted on each side of said hull between said leading edge and said trailing edge, a channel member mounted in said hull extending substantially along and spaced from the leading edge, said channel member being hermetically mounted to said leading edge to form a leading edge duct, said duct having a uniform taper toward its center, said duct defining a coextensive exhaust port having a front edge and located proximate the base of said hull, a guide arm depending from each edge of said exhaust port to direct flow beneath the vehicle, means pivotally and retractably mounting said guide arms, said guide arms defining a nozzle, the guide arm mounted on the front edge of the exhaust port defining a series of spaced, curved guide ports extending therethrough and adapted to channel part of the flow through said exhaust port up around the leading edge, a plurality of spaced, curved, overlapped guide veins pivotally mounted in the leading edge and adapted to direct a part of the flow in said duct up around the vehicle exterior whereby the stagnation point of ambient flow about the leading edge of the vehicle is located below the lowermost guide port and a series of peripheral duct means including said leading edge duct and mounted in the base of said vehicle to discharge air downwardly and beneath the vehicle to form a supporting air cushion when the vehicle is in proximity to an underlying surface.

3. An amphibious vehicle comprising a hull having a substantially rectangular cross section in a first plane and an airfoil-shaped cross section in a plane normal to said first plane and having a leading edge, a base and a trailing edge, said trailing edge being formed by a trailing edge duct rotatably mounted in said hull, a pair of swept-back side plates, one being mounted on each side of the hull between said leading edge and said trailing edge, a wall member mounted in said trailing edge duct and hermetically compartmenting said trailing edge duct into a primary duct and a secondary duct, an exhaust nozzle formed in each of said primary and secondary ducts, said trailing edge duct being rotatable between a first and a second position, bushing means mounted in said hull to seal the exhaust nozzle of said secondary duct in the first position, means supplying air into said primary and secondary ducts whereby movement of said duct to said first position blocks the nozzle of said secondary duct and enables flow through said primary duct to exit beneath the vehicle and movement of said duct to said second position enables flow through said primary and secondary ducts to exit in paths extending away from said trailing edge and to commingle to form an artificial trailing edge and peripheral duct means mounted in the base of the vehicle and including said primary duct to discharge air downwardly and beneath the vehicle to form a supporting air cushion when the vehicle is in proximity to an underlying surface.

4. An amphibious vehicle comprising a hull having a substantially rectangular cross section in a first plane and an airfoil-shaped cross section in a plane normal to said first plane and having a leading edge, a base and a trailing edge, said trailing edge being formed by a trailing edge duct extending substantially across and rotatably mounted in said hull, a pair of divergent, swept-back side plates, one being mounted on each side of said hull between said leading edge and said trailing edge, a curved wall member extending the length of said trailing edge duct and hermetically mounted in said duct to compartment said duct into a primary duct and a secondary duct, an exhaust nozzle formed in each of said primary and secondary ducts, said nozzles being spaced approximately 45° apart, said trailing edge duct being rotatable through approximately 60° between a first and a second position, bushing means mounted within said hull proximate the base to seal the secondary duct exhaust nozzle when it is in the first position, means supplying air into said primary and secondary ducts whereby movement of said duct to said first position blocks said secondary duct nozzle and enables flow through said primary duct to exit beneath the vehicle and rotation of said duct to said second position enables flow through said primary and secondary ducts to exit in converging paths directed away from said trailing edge so as to commingle to form an artificial trailing edge and peripheral duct means mounted in the base of the vehicle and including said primary duct in said first position to discharge air downwardly and beneath the vehicle to form a supporting air cushion when the vehicle is in proximity to an underlying surface.

5. An amphibious vehicle comprising a hull having a substantially rectangular cross section in a first plane and an airfoil-shaped cross section in a plane normal to said first plane and having a leading edge, a trailing edge, a top and a base, a pair of swept-back side plates each having a top, one being mounted on each side of said hull between said leading edge and said trailing edge, a channel member located within said hull and said side plates proximate said trailing edge and spaced from the top of said hull and said side plates, means hermetically mounting said channel member to the top of said hull and side plates to define a boundary layer conduit, the top of said hull and side plates defining a series of spaced boundary layer control slots extending across said hull and up said side plates and communicating said boundary layer conduit with the atmosphere, a plurality of fans mounted in said boundary layer conduit to evacuate said conduit, the top of said hull defining an exit port for said boundary layer conduit located rearward of said fan proximate the trailing edge whereby boundary layer air in ingested within said boundary layer conduit and exhausted over said trailing edge and a series of peripheral duct means mounted in the base of said vehicle to discharge air downwardly and beneath the vehicle to form a supporting air cushion when the vehicle is in proximity to an underlying surface.

6. An amphibious vehicle comprising a hull having a substantially rectangular cross section in a first plane and an airfoil-shaped cross section in a plane normal to said first plane and having a leading edge, a top, a trailing edge and a base, a pair of divergent, substantially triangular, swept-back side plates each having a top and a trailing edge, one being mounted along each side of the hull between the leading edge and the trailing edge, a channel member located within said hull and said side plates proximate the trailing edge and spaced from the top of said hull and said side plates, means hermetically mounting said channel member to the top of said hull and side plates to define a boundary layer conduit, the top of said hull and side plates defining a series of spaced boundary layer control slots each extending across said hull and up said side plates and communicating said boundary layer conduit with the atmosphere, a plurality of spaced fans mounted athwart said boundary layer conduit between the rearmost boundary layer control slot and the trailing edge to evacuate said conduit, the top of said hull defining an exit port for said conduit, said exit port being located rearward of said fans and proximate said trailing edge whereby boundary layer air is ingested within said boundary layer conduit and exhausted over said trailing edge, duct means peripherally mounted in the base of the vehicle to discharge air downwardly and beneath the vehicle to form a supporting air cushion for the vehicle, each of said side plates defining an air channel formed along substantially the entire length of the trailing edge of the side plate, a rudder pivotally mounted in each of said channels and extending past the trailing edge of the side plate and means supplying ingested air to each of said channels whereby ingested air flowing over the rudders steers and stabilizes the vehicle.

7. An amphibious vehicle comprising a hull having a substantially rectangular cross section in a first plane and an airfoil-shaped cross section in a plane normal to said first plane and having a leading edge, a base and a trailing edge, a pair of divergent, swept-back side plates of substantially triangular shape and having a leading edge, one being mounted on each side of said hull between said leading edge and said trailing edge, a trailing edge duct mounted in said hull and forming the trailing edge of the hull, a wall member mounted in said trailing edge duct and compartmenting the trailing edge duct to define a first duct and a second duct, a leading edge duct formed in the leading edge of the vehicle, a side duct mounted in each side of the vehicle and interconnecting said trailing edge duct and said leading edge duct, stabilizing duct means comprising a pair of intersected ducts interconnecting said side ducts, having a common passage and intercommunicating at said common passage and a branched duct having a base conduit and branch conduits, said branched duct intercommunicating said common passage and said second duct, all of said ducts having coextensive nozzles formed therein to discharge beneath the base of the vehicle, said leading and trailing edge ducts and said intersected ducts being uniformly tapered from the sides of said hull whereby substantially constant volumetric flow is maintained therethrough, each side plate defining an air scoop proximate its leading edge and opening into the atmosphere, a first conduit mounted in each side plate and intercommunicating said leading edge duct and said air scoop, a second conduit mounted in each side plate and intercommunicating said trailing edge duct and said air scoop, a third conduit mounted in each side plate and intercommunicating said one of said side ducts and said intersected ducts with said air scoop, a fan mounted in each of said conduits for ingesting ambient air and a pair of booster fans mounted in each end of said intersected ducts to boost the pressure therein to approximately double the pressure in the leading and trailing edge ducts and side ducts whereby a supporting air cushion comprising a plurality of discrete compartments is formed beneath the hull of the vehicle when the vehicle is in proximity to an underlying surface.

8. An amphibious vehicle comprising a hull having a substantially rectangular cross section in a first plane and an airfoil-shaped cross section in a plane normal to said first plane and having a leading edge, a trailing edge and a base, a pair of divergent, swept-back, substantially triangularly-shaped side plates each having a side plate tip and a trailing edge, one being mounted substantially along each side of the hull between the leading edge and the trailing edge, a pair of thrust-producing means on the tip of each side plate whereby the degree of rotation of said thrust-producing means during operation thereof controls the take-off, landing and steering of the vehicle, each trailing edge of said side plates defining an air channel, a rudder rotatably mounted in each channel and extending beyond the trailing edge of the respective side plate, means supplying air to said channels whereby air flowing through said channels impinges upon said rudders and the degree of rotation of said rudders determines the direction of motion of said vehicle, and duct means peripherally mounted in said base to direct air downwardly and beneath the vehicle to form a supporting air cushion when the vehicle is in proximity to an underlying surface.

9. An amphibious vehicle comprising a hull having a substantially rectangular cross section in a first plane and an airfoil-shaped cross section in a plane normal to said first plane and having a leading edge, a trailing edge, a base and a top, a trailing edge duct rotatably mounted in said hull and forming the trailing edge, a pair of swept-back side plates each having a top, a trailing edge, a leading edge, and a tip, means mounting one of said side plates on each side of said hull between the leading edge and the trailing edge, a wall member mounted in said trailing edge duct and hermetically compartmenting said trailing edge duct into a primary duct and a secondary duct, an exhaust nozzle formed in each of said primary and secondary ducts, said trailing edge duct being rotatable between a first and a second position, bushing means mounted in said hull to seal the exhaust nozzle of said secondary duct in the first position, a first channel member located within said hull and spaced from the leading edge of said hull, means hermetically mounting said channel member to said leading edge to form a leading edge duct, said leading edge duct defining a coextensive exhaust port located proximate said base and having a front edge, a guide arm dependingly mounted on each edge of said exhaust port and extending beneath the vehicle, said guide arms defining a nozzle, said leading edge defining a plurality of spaced, curved guide veins extending thereacross, the guide arm mounted on said front edge defining a plurality of spaced, curved guide ports intercommunicating said nozzle and the atmosphere, a side duct mounted on each side of said hull and interconnecting said leading and trailing edge ducts, a coextensive nozzle formed in each side duct exhausting beneath the vehicle, said side ducts and said leading and trailing edge ducts defining a peripheral ducting system, a plurality of stabilizing ducts having depending coextensive nozzles formed therein and mounted in the base of the vehicle, said stabilizing ducts interconnecting said peripheral ducts to segment the base of the vehicle into a plurality of discrete compartments, a second channel member located within said hull and side plate and spaced from the top of said hull and side plates, means hermetically mounting said second channel member to the top of said hull and side plates to define a conduit, the top of said hull and side plates defining a series of spaced slots extending across said hull and up said side plates and communicating said conduit with the atmosphere, means mounted in said conduit to evacuate said conduit, the top of said hull defining an exit port located rearward of said last-named means and proximate the trailing edge, each of said side plates defining an air channel formed along the trailing edge thereof, a rudder means pivotally mounted in each of said channels and extending beyond the trailing edge of the respective side plate, means supplying air to said channel, means to supply air to said peripheral and stabilizing ducts to form a supporting air cushion beneath the vehicle when the vehicle is in proximity to an underlying surface and thrust-producing means rotatably mounted in the tip of each side plate.

10. An amphibious vehicle comprising a hull having a substantially rectangular cross section in a first plane and an airfoil-shaped cross section in a plane normal to said first plane characterized by a low pitching moment which is constant with respect to angle of attack, said hull having a leading edge, a trailing edge and a base, leading edge duct means mounted along the extent of said leading edge having a plurality of openings spaced apart in said normal plane and including openings below said leading edge to direct flow upward and around said leading edge, peripheral jet nozzle means mounted around the periphery of said base directed downwardly and inwardly, a side plate mounted on each side of said hull and extending from said leading edge to said trailing edge, said vehicle defining an air intake opening to ingest ambient air, compressing means located within said vehicle to compress the ingested air, duct means interconnecting said compressing means and said leading edge duct and peripheral jet nozzle means for feeding compressed air to the openings in said leading edge duct and said peripheral jet nozzle means to produce a stagnation point below said leading edge and to produce a supporting air cushion to lift said vehicle from an underlying surface and propulsion means mounted in said vehicle to advance said vehicle with respect to said underlying surface.

11. An amphibious vehicle comprising a hull having a substantially rectangular cross section in a first plane and an airfoil-shaped cross section in a plane normal to said first plane characterized by a low pitching moment which is constant with respect to angle of attack, said hull having a thickness-to-chord ratio greater than 20 percent and including a leading edge, a trailing edge and a base, leading edge duct means mounted along the extent of said leading edge having a plurality of openings spaced apart in said normal plane and including openings below said leading edge to direct flow upward and around said leading edge, peripheral jet nozzle means mounted around the periphery of said base directed downwardly and inwardly, a side plate mounted on each side of said hull and extending from said leading edge to said trailing edge, a plurality of boundary layer control slots defined by the top aft portion of said hull and extending between said side plates, said vehicle defining an air intake opening to ingest ambient air, compressing means located within said vehicle to compress the ingested air, duct means interconnecting said compressing means and said leading edge duct and peripheral jet nozzle means for feeding compressed air to the openings in said leading edge duct and said peripheral jet nozzle means to produce a stagnation point below said leading edge and to produce a supporting air cushion to lift said vehicle from an underlying surface and propulsion means mounted in said vehicle to advance said vehicle with respect to said underlying surface.

12. An amphibious vehicle comprising a hull having a substantially rectangular cross section in a first plane and an airfoil-shaped cross section in a plane normal to said first plane characterized by a low pitching moment which is constant with respect to angle of attack, said hull having a leading edge, a trailing edge and a base, leading edge duct means mounted along the extent of said leading edge, the forward portion of said leading edge duct defining an exhaust opening, a plurality of vertically spaced upwardly facing guide vanes mounted in said exhaust opening to direct flow up and around said leading edge, a pair of guide arms pivotally mounted on either side of said exhaust opening below said guide vanes, means retractably mounting said guide arms between a first position facing downwardly and inwardly and a second position wherein said guide arms are substantially flush with said base, peripheral jet nozzle means including said guide arms and mounted around the periphery of said base directed downwardly and inwardly, a side plate mounted on each side of said hull and extending from said leading edge to said trailing edge, said vehicle defining an air intake opening to ingest ambient air, compressing means located within said vehicle to compress the ingested air, duct means interconnecting said compressing means and said leading edge duct and peripheral jet nozzle means for feeding compressed air to the vanes in said leading edge duct and said peripheral jet nozzle means to produce a stagnation point below said leading edge and to produce a supporting air cushion to lift said vehicle from an underlying surface and propulsion means mounted in said vehicle to advance said vehicle with respect to said underlying surface.

13. An amphibious vehicle comprising a hull having a substantially rectangular cross section in a first plane and an airfoil-shaped cross section in a plane normal to said first plane characterized by a low pitching moment which is constant with respect to angle of attack, said hull having a leading edge, a trailing edge and a base, trailing edge duct means rotatably mounted along the extent of said trailing edge and comprising two discrete compartments, each of said compartments having an exhaust nozzle, said exhaust nozzles being separated and directed convergently at an acute angle, means for rotating said trailing edge duct between a first position wherein one of said nozzles is sealed closed and the other of said nozzles is directed downwardly and inwardly and a second position wherein said one nozzle will direct flow horizontally outwardly and said other nozzle will direct flow downwardly and outwardly, leading edge duct means mounted along the extent of said leading edge having a plurality of openings spaced apart in said normal plane and including openings below said leading edge to direct flow upward and around leading edge, peripheral jet nozzle means including said trailing edge duct and mounted around the periphery of said base directed downwardly and inwardly, a side plate mounted on each side of said hull and extending from said leading edge to said trailing edge, said vehicle defining an air intake opening to ingest ambient air, compressing means located within said vehicle to compress the ingested air, duct means interconnecting said compressing means and said leading edge duct and peripheral jet nozzle means for feeding compressed air to the openings in said leading edge duct and said peripheral jet nozzle means to produce a stagnation point below said leading edge, to produce a supporting air cushion to lift said vehicle from an underlying surface when said trailing edge duct is in said first position and to produce an artificial trailing edge of air when said trailing edge duct is in said second position, and propulsion means mounted in said vehicle to advance said vehicle with respect to said underlying surface.

14. An amphibious vehicle comprising a hull having a substantially rectangular cross section in a first plane and an airfoil-shaped cross section in a plane normal to said first plane characterized by a low pitching moment which is constant with respect to angle of attack, said hull having a leading edge, a trailing edge and a base, leading edge duct means mounted along the extent of said leading edge having a plurality of openings spaced apart in said normal plane and including openings below said leading edge to direct flow upward and around said leading edge, peripheral jet nozzle means mounted around the periphery of said base directed downwardly and inwardly, stabilizing jet nozzle means mounted within the periphery of said base dividing said base into a plurality of discrete compartments and directed vertically downwardly, a side plate mounted on each side of said hull and extending from said leading edge to said trailing edge, said vehicle defining an air intake opening to ingest ambient air, compressing means located within said vehicle to compress the ingested air, duct means interconnecting said compressing means and said leading edge duct, said peripheral jet nozzle means and said stabilizing jet nozzle means for feeding compressed air to the openings in said leading edge duct and said peripheral jet nozzle means to produce a stagnation point below said leading edge and to produce a supporting air cushion to lift said vehicle from an underlying surface and propulsion means mounted in said vehicle to advance said vehicle with respect to said underlying surface.

15. Apparatus as set forth in claim 14 including additional compressing means mounted in said duct means for raising the pressure in said stabilizing jet nozzles to approximately double the pressure in said peripheral jet nozzle means.

16. An amphibious vehicle comprising a hull having a substantially rectangular cross section in a first plane and an airfoil-shaped cross section in a plane normal to said first plane characterized by a low pitching moment which is constant with respect to angle of attack, said hull having a leading edge, a trailing edge and a base, trailing edge duct means rotatably mounted along the extent of said trailing edge and comprising two discrete compartments, each of said compartments having an exhaust nozzle, said exhaust nozzles being separated and directed convergently at an acute angle, means for rotating said trailing edge duct between a first position wherein one of said nozzles is sealed closed and the other of said nozzles is directed downwardly and inwardly and a second position wherein said one nozzle will direct flow horizontally outwardly and said other nozzle will direct flow downwardly, leading edge duct means mounted along the extent of said leading edge, the forward portion of said leading edge duct defining an exhaust opening, a plurality of vertically spaced upwardly facing guide vanes mounted in said exhaust opening to direct flow up and around said leading edge, a pair of guide arms pivotally mounted on either side of said exhaust opening below said guide vanes, means retractably mounting said guide arms between a first position facing downwardly and inwardly and a second position wherein said guide arms are substantially flush with said base, a side plate mounted on each side of said hull and extending from said leading edge to said trailing edge, side duct means mounted in each side plate extending from said leading edge to said trailing edge and having exhaust nozzles directed inwardly and downwardly, stabilizing jet nozzle means mounted within the periphery of said base dividing said base into a plurality of discrete compartments and directed vertically downwardly, said vehicle defining an air intake opening to ingest ambient air, compressing means located within said vehicle to compress the ingested air, duct means interconnecting said compressing means and said leading edge duct, said trailing edge duct, said side ducts and said stabilizing nozzle means for feeding compressed air to the openings in said leading edge duct, to said side ducts, said stabilizing nozzles and to the compartments of said trailing edge duct to produce a stagnation point below said leading edge, to produce a supporting air cushion to lift said vehicle from an underlying surface when said guide arms are in said first position and said trailing edge duct is in said first position and to form an artificial trailing edge of air when said trailing edge duct is in said second position, and propulsion means mounted in said vehicle to advance said vehicle with respect to said underlying surface.

17. An amphibious vehicle comprising a hull having a substantially rectangular cross section in a first plane and an airfoil-shaped cross section in a plane normal to said first plane characterized by a low pitching moment which is constant with respect to angle of attack, said vehicle having an aspect ratio greater than 1, said hull having a leading edge, a trailing edge and a base, leading edge duct means mounted along the extent of said leading edge having a plurality of openings spaced apart in said normal plane and including openings below said leading edge to direct flow upward and around said leading edge, peripheral jet nozzle means mounted around the periphery of said base directed downwardly and inwardly, a side plate mounted on each side of said hull and extending from said leading edge to said trailing edge, said vehicle defining an air intake opening to ingest ambient air, compressing means located within said vehicle to compress the ingested air, duct means interconnecting said compressing means and said leading edge duct and peripheral jet nozzle means for feeding compressed air to the openings in said leading edge duct and said peripheral jet nozzle means to produce a stagnation point below said leading edge and to produce a supporting air cushion to lift said vehicle from an underlying surface and propulsion means mounted in said vehicle to advance said vehicle with respect to said underlying surface.

18. An amphibious vehicle comprising a hull having a substantially rectangular cross section in a first plane and an airfoil-shaped cross section in a plane normal to said first plane characterized by a low pitching moment which is constant with respect to angle of attack, said hull having a leading edge, a trailing edge and a base, trailing edge duct means rotatably mounted along the extent of said trailing edge and comprising two discrete compartments, each of said compartments having an exhaust nozzle, said exhaust nozzles being separated and directed convergently at an acute angle, means for rotating said trailing edge duct between a first position wherein one of said nozzles is sealed closed and the other of said nozzles is directed downwardly and inwardly and a second position wherein said one nozzle will direct flow horizontally outwardly and said other nozzle will direct flow downwardly and outwardly, leading edge duct means mounted along the extent of said leading edge having a plurality of openings spaced apart in said normal plane and including openings below said leading edge to direct flow upward and around said leading edge, peripheral jet nozzle means including said trailing edge duct and mounted around the periphery of said base directed downwardly and inwardly, a side plate mounted on each side of said hull and extending from said leading edge to said trailing edge, a channel member located within said hull extending between said side plates spaced from the top aft portion of said hull and hermetically mounted thereon, the top aft portion of said hull defining a plurality of boundary layer control slots spaced along the chord thereof, said channel member and hull comprising a boundary layer conduit, an exhaust fan mounted in said boundary layer conduit to evacuate said conduit, said conduit defining an exit port located aft of said fan proximate said trailing edge and extending across said hull, said vehicle defining an air intake opening to ingest ambient air, compressing means located within said vehicle to compress the ingested air, duct means interconnecting said compressing means and said leading edge duct and peripheral jet nozzle means for feeding compressed air to the openings in said leading edge duct and said peripheral jet nozzle means to produce a stagnation point below said leading edge and to produce a supporting air cushion to lift said vehicle from an underlying surface when said trailing edge duct is in said first position and to produce an artificial trailing edge of air to guide ingested air exhausted from said boundary layer conduit when said trailing edge duct is in said second position and propulsion means mounted in said vehicle to advance said vehicle with respect to said underlying surface.

19. An amphibious vehicle comprising a hull having a substantially rectangular cross section in a first plane and an airfoil-shaped cross section in a plane normal to said first plane characterized by a low pitching moment which is constant with respect to angle of attack, said hull having a leading edge, a trailing edge and a base, leading edge duct means mounted along the extent of said leading edge having a plurality of openings spaced apart in said normal plane and including openings below said leading edge to direct flow upward and around said leading edge, peripheral jet nozzle means mounted around the periphery of said base directed downwardly and inwardly, a side plate mounted on each side of said hull and extending from said leading edge to said trailing edge, each of said side plates being swept back to provide a three dimensional center of pressure aft of the center of gravity of the vhicle, said vehicle defining an air intake opening to ingest ambient air, compressing means located within said vehicle to compress the ingested air, duct means interconnecting said compressing means and said leading edge duct and peripheral jet nozzle means for feeding compressed air to the openings in said leading edge, duct and said peripheral jet nozzle means to produce a stagnation point below said leading edge and to produce a supporting air cushion to lift said vehicle from an underlying surface and propulsion means mounted in said vehicle to advance said vehicle with respect to said underlying surface.

20. An amphibious vehicle comprising a hull having a substantially rectangular cross section in a first plane and an airfoil-shaped cross section in a plane normal to said first plane characterized by a low pitching moment which is constant with respect to angle of attack, said hull having a leading edge, a trailing edge and a base, leading edge duct means mounted along the extent of said leading edge having a plurality of openings spaced apart in said normal plane and including openings below said leading edge to direct flow upward and around said leading edge, peripheral jet nozzle means mounted around the periphery of said base directed downwardly and inwardly, a side plate mounted on each side of said hull and extending from said leading edge to said trailing edge, each side plate having a tip, said vehicle defining an air intake opening to ingest ambient air, compressing means located within said vehicle to compress the ingested air, duct means interconnecting said compressing means and said leading edge duct and peripheral jet nozzle means for feeding compressed air to the openings in said leading edge duct and said peripheral jet notzle means to produce a stagnation point below said leading edge and to produce a supporting air cushion to lift said vehicle from an underlying surface and propulsion means rotatably mounted in the tips of said side plates to advance said vehicle with respect to said underlying surface.

21. An amphibious vehicle comprising a hull having a substantially rectangular cross section in a first plane and an airfoil-shaped cross section in a plane normal to said first plane characterized by a low pitching moment which is constant with respect to angle of attack, said hull having a leading edge, a trailing edge and a base, leading edge duct means mounted along the extent of said leading edge having a plurality of openings spaced apart in said normal plane and including openings below said leading edge to direct flow upward and around said leading edge, a side plate mounted on each side of said hull and extending from forward of said leading edge to aft of said trailing edge and depending below said base, said vehicle defining an air intake opening to ingest ambient air, side ducts mounted along the extent of said side plates and extending below said base and having jet nozzles directed inwardly and downwardly, peripheral jet nozzle means including said side duct nozzles mounted around the periphery of said base directed downwardly and inwardly, compressing means located within said vehicle to compress the ingested air, duct means interconnecting said compressing means and said leading edge duct and peripheral jet nozzle means for feeding compressed air to the openings in said leading edge duct and said peripheral jet nozzle means to produce a stagnation point below said leading edge and to produce a supporting air cushion to lift said vehicle from an underlying surface and propulsion means mounted in said vehicle to advance said vehicle with respect to said underlying surface.

22. An amphibious vehicle comprising a hull having a substantially rectangular cross section in a first plane and an airfoil-shaped cross section in a plane normal to said first plane characterized by a low pitching moment which is constant with respect to angle of attack, said hull having a leading edge, a trailing edge and a base, leading edge duct means mounted along the extent of said leading edge having a plurality of openings spaced apart in said normal plane and including openings below said leading edge to direct flow upward and around said leading edge, peripheral jet nozzle means mounted around the periphery of said base directed downwardly and inwardly, a side plate mounted on each side of said hull and extending from said leading edge to said trailing edge, each side plate having a tip, the front of each side plate defining an air intake opening to ingest ambient air, compressing means located within said side plates to compress the ingested air, duct means mounted in each side plate and interconnecting said compressing means and said leading edge duct and peripheral jet nozzle means for feeding compressed air to the openings in said leading edge duct and said peripheral jet nozzle means to produce a stagnation point below said leading edge and to produce a supporting air cushion to lift said vehicle from an underlying surface and propulsion means rotatably mounted in the tip of each side plate to advance and steer said vehicle with respect to said underlying surface.

23. A vehicle comprising a hull having a leading edge, a trailing edge, sides and a base, peripheral jet nozzle means including nozzles mounted proximate said leading edge, trailing edge and sides mounted around the periphery of said base and directed downwardly and inwardly, stabilizing nozzle means including a pair of convergent jet nozzles extending from proximate each side jet nozzle toward the center of the hull and merging to form a single jet nozzle extending on either side of the hull center line and a jet nozzle extending from the center of said single jet nozzle to proximate said trailing edge jet nozzle, all of said stabilizing nozzles being directed vertically downwardly, said vehicle defining an air intake opening to ingest ambient air, compressing means located within said vehicle to compress the ingested air, duct means interconnecting said compressing means and said peripheral jet nozzle means and said stabilizing jet nozzle means for feeding compressed air to said peripheral jet nozzle means and said stabilizing jet nozzle means, booster means mounted in said vehicle to increase the supply pressure to said stabilizing nozzle means to twice the pressure of the air supplied to said peripheral jet nozzle means whereby air exhausted through said peripheral and stabilizing jet nozzle means will produce a supporting air cushion to lift said vehicle from an underlying surface and propulsion means mounted in said vehicle to advance said vehicle with respect to said underlying surface.

References Cited in the file of this patent

UNITED STATES PATENTS

| | | |
|---|---|---|
| 2,364,676 | Warner | Dec. 12, 1944 |
| 2,364,677 | Warner | Dec. 12, 1944 |

| | | |
|---|---|---|
| 2,478,726 | Trey | Aug. 9, 1949 |
| 2,867,392 | Lear | Jan. 6, 1959 |
| 2,939,650 | Coanda | June 7, 1960 |
| 2,961,192 | Davidson | Nov. 22, 1960 |

OTHER REFERENCES

Dept. of the Navy, David Taylor Model Basin Report 1371, Aero Report 966, "Preliminary Design Technique for Annular-Jet Ground-Effect Machines (Gems)," September 1959, 13 pages.